April 17, 1956    A. W. SADDINGTON ET AL    2,742,422
APPARATUS FOR RESOLVING HIGHLY STABLE SUSPENSIONS
Filed Nov. 2, 1951    5 Sheets-Sheet 1

A. W. SADDINGTON
S. A. COLEMAN
INVENTORS

ATTORNEY

A.W. SADDINGTON
S. A. COLEMAN
INVENTORS

ATTORNEY

April 17, 1956     A. W. SADDINGTON ET AL     2,742,422
APPARATUS FOR RESOLVING HIGHLY STABLE SUSPENSIONS
Filed Nov. 2, 1951                             5 Sheets-Sheet 3

A. W. SADDINGTON
S. A. COLEMAN
INVENTORS

ATTORNEY

A.W. SADDINGTON
S. A. COLEMAN
INVENTORS

ATTORNEY

A. W. SADDINGTON
S. A. COLEMAN
INVENTORS

ATTORNEY

# United States Patent Office 2,742,422
Patented Apr. 17, 1956

2,742,422

APPARATUS FOR RESOLVING HIGHLY STABLE SUSPENSIONS

Arthur W. Saddington and Spencer A. Coleman, La Mesa, Calif.

Application November 2, 1951, Serial No. 254,603

18 Claims. (Cl. 210—52)

In the copending application of A. W. Saddington and G. R. Tully, Jr. entitled "Method of Clarifying Crude Solutions of Alginates," filed November 2, 1951, under Serial No. 254,602, now abandoned the subject matter of which, however, has not been abandoned and is now described and claimed in a co-pending continuation-in-part application filed by said applicants on January 10, 1955, under Serial No. 480,978 there is described a process directed to the rapid and economical separation of cellulosic residues from the solutions of water-soluble alginic salts resulting from the digestion of kelps with aqueous alkaline solutions, this method being capable of performance in apparatus known to the prior art.

The primary purpose of the present invention is to provide a more effective and less costly apparatus for carrying out the above method than has heretofore been known, this apparatus also being applicable in other situations in which parallel conditions and limitations are encountered.

A purpose of the invention is to provide apparatus for separating finely divided solids or organic semi-solids from suspension in liquids which have a specific gravity only slightly less than that of the suspensoid.

A purpose of the invention is to provide means for separating semigelatinous solids from suspension in relatively viscous liquids;

A purpose of the invention is to provide apparatus in which suspensions of solids, particularly such as are of substantially uniform particle size and specific gravity, are subjected simultaneously to flotation and to sedimentation for the more complete and rapid removal of the solids than is possible with the application of either effect alone.

The invention will best be understood with reference to the attached drawings and the following description thereof, in which.

Figure 1:
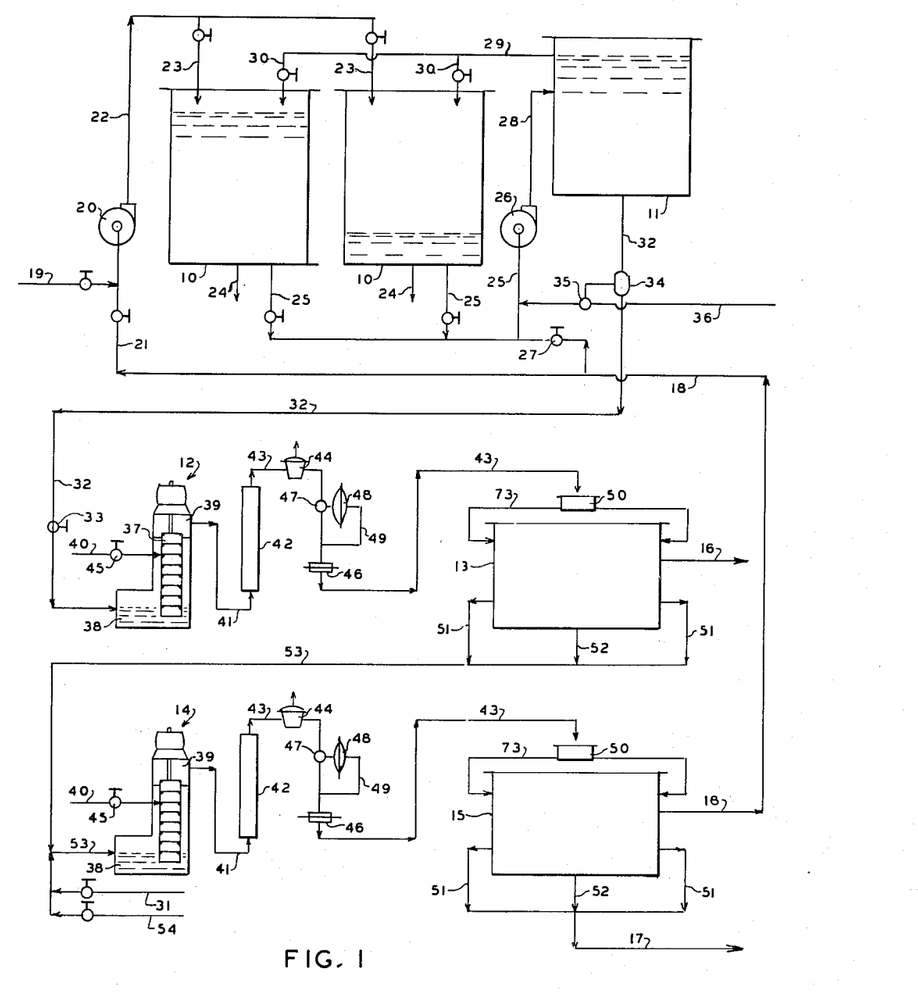
Fig. 1 is a diagram showing an assemblage of apparatus in which the invention is embodied, this figure showing also the flows in an operation in which the apparatus is used for the separation of cellulose from a crude alginic solution.

Reference is first made to Fig. 1, showing an assemblage of apparatus in which the invention is embodied. In this figure, 10—10 indicates a plurality of storage tanks; 11 a feed tank in which the liquid to be treated is maintained at constant liquid level and at constant viscosity; 12 is a primary aerator in which the feed solution or "crude liquor" is intimately blended with air, and 13 is a primary separating cell in which the major part of the suspensoid originally contained in the crude liquor is separated as mud fractions.

14 is a secondary aerator in which the muds drawn from the primary cell are strongly diluted with water and intimately blended with air; 15 a secondary separating cell in which the major part or substantially all of the suspensoid present in the primary muds is separated from a secondary liquor containing most of any solute present in these muds; 16 a conduit for withdrawing the primary liquor, at least partially freed from suspensoid, to a point of disposition as for example to a filtering station; 17 a conduit for withdrawing muds from the secondary separator to a point of disposition, as for example to waste, and 18 a conduit for returning the secondary liquor to the intake end of the system to dilute the entering supply of suspension.

It is apparent that the described apparatus provides primary processing means including the primary aerator 12 and the primary separating cell 13, and provides secondary processing means including the secondary aerator 14 and the secondary separating cell 15. It is further apparent that the described arrangement is such that muds from the primary processing means are processed in the secondary processing means to produce a solution that is recycled through the primary processing means, the end product in the form of a clarified solution being taken from the primary processing means.

When the suspension to be separated originates in an alginic digestion product, which is normally of a pasty or highly viscous consistency, of variable alkalinity and liable to be contaminated by sand, shell fragments or other heavy solids which would interfere with subsequent operations, the tanks 10—10 provide a locus for dilution of the product to the point at which the heavy solids will settle readily and for any needed pH and viscosity adjustments. In the handling of suspensions not requiring such preliminary steps, these tanks may be omitted, or a single tank may conveniently be used as a surge tank.

In the use of the apparatus for its primary purpose, the clarification of crude alginic solutions, a stream of the digestion product from digesters or macerators not shown enters the system at 19 and is mixed in a pump 20 with a stream of a highly dilute alginate solution (the secondary liquor) returning from secondary separator 15 through conduit 18 and branch conduit 21. The diluted product passes through conduit 22 and valved branches 23—23 into one or the other of tanks 10, from which the settled sand is removed from time to time as indicated at 24.

At this point the diluted product is an aqueous solution of a water-soluble alginate, usually sodium alginate, containing a large proportion (for example, 60% to 80% of the algin content) of finely divided cellulose resulting from the breaking down of the kelp structure during digestion, together with a lesser but material proportion of solid, water-insoluble alginic materials of variable composition. These insoluble solids travel through the system with the cellulose, up to the secondary stage of separation, in which they may disappear by passing into solution, and are considered to be a part of the cellulose in the ensuing description.

A stream of the diluted solution is drawn from one or the other of tanks 10—10, used alternately, through conduit 25 by a pump 26 in which it is blended with the remainder of the secondary liquor, drawn from conduit 18 through branch 27. The solution then passes through conduit 28 into feed supply tank 11, in which a constant liquid level is maintained by an overflow line 29 and valved branches 30—30 or by control of the delivery of pump 26. The degree to which the solution is diluted in these steps is controlled initially by varying the amount of fresh water introduced into secondary aerator 14 through conduit 31, and finally by a viscosity control later described.

A stream of the solution passes continuously, preferably by gravity, from tank 11 to primary aerator 12 through conduit 32, in which valve 33 is a stop valve only. It is highly important to the success of the primary separation that the viscosity of the feed stream be controlled within very narrow limits, as for example within 1 centipoise on either side of the viscosity which has been fixed on as optimum for the operation on the material being treated.

Control of the water supply to the secondary aerator will maintain a close approach to the permissible limits, but because of the quantity of solution always present in the secondary separating stage, the response to changed adjustment at the aerator is slow. To take up this lag we insert in feed conduit 32 a continuous viscosimeter indicated at 34, which is connected to actuate a valve 35 controlling a small flow of fresh water through conduit 36 into conduit 25 and thus into tank 11. With proper attention to manual regulation of water flow into the secondary aerator, the quantity of water introduced in this manner directly into tank 11 rarely exceeds two percent of the flow out of the tank and averages nearer one percent.

Figure 14:
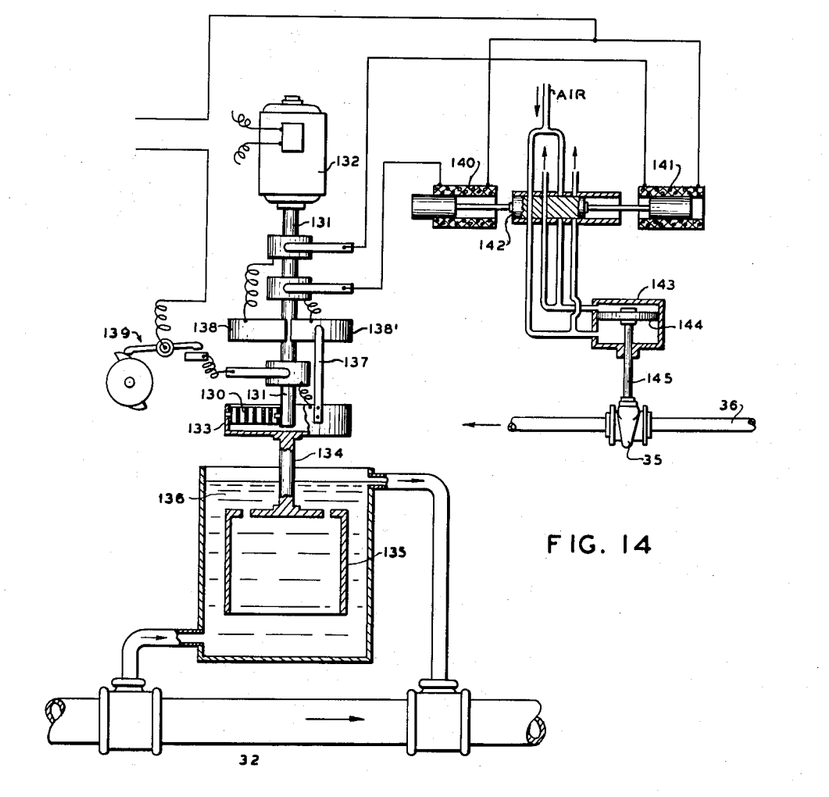
Fig. 14 is a diagrammatic illustration of a viscosity-responsive device adapted to control the fresh water supply through conduit 36 of Fig. 1.

An instrument adapted to the control of this small water stream is illustrated in diagrammatic form in Fig. 14. Referring to this figure, a spiral spring 130 is attached at its inner end to the lower end of a vertical shaft 131 rotated by a constant speed motor 132, the spring having its outer end attached to the rim of a circular enclosing case 133. A second shaft 134 projected from the bottom of the case carries a drum 135 immersed in a flowing body 136 of the feed liquid diverted from feed conduit 32 of Fig. 1. A brush 137 projected upwardly from the rim of the case bears on an arcuate commutator fixed to and revolving with shaft 131, this member consisting of two segments 138—138' insulated from each other.

As the torque on shaft 134 changes by reason of a change in viscosity of the liquid in liquid body 136, an electrical contact through brush 137 is made alternately with segments 138—138'. Current flow is controlled by a clock actuated timing device 139 which closes the circuit momentarily at predetermined brief intervals. The resultant electrical impulses are transmitted to solenoids 140—141 which shift the position of a piston valve 142 which admits air under pressure to alternate ends of a pneumatic cylinder 143. This cylinder has a piston 144 connected with valve stem 145 which opens and closes the auxiliary water supply valve 35 of Fig. 1.

The cellulose suspended in the crude liquor is difficult to remove by air flotation, and the ensuing flotation step will not be performed most effectively unless the aeration means divides the entrained air into extremely minute and correspondingly numerous bubbles. While the invention contemplates the use of any preferred aeration means, we have found that the prior art apparatus does not give the best results in this difficult service and have therefore devised an improved aerator by the use of which the proportion of cellulose removed in the flotation steps is materially increased.

This device consists essentially of a continuous delivery liquid pump—centrifugal, turbine, gear, vane or multiple piston—capable of raising the liquid to from 20# to 80# gauge, in series with a turbulence-producing element—a high speed centrifugal or turbine pump or any mechanical beater adapted to operate under pressure—with means for introducing into the discharge of the liquid pump a stream of air under pressure sufficient to overcome the liquid pressure. The air thus introduced between the two main elements tends to destroy any effectiveness of the second stage (turbulence) element as a pressure-raising means, but causes a turbine pump or straight blade centrifugal to produce extreme turbulence in the fluids supplied to it, and consequently an extremely fine dispersion of air throughout the liquid. With this arrangement, the suction of the primary pump will not break unless the air supply be grossly overloaded.

Figure 15:
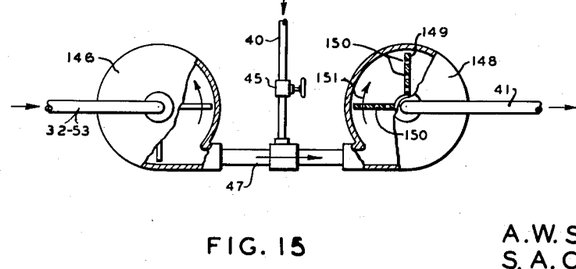
Fig. 15 is a diagrammatic illustration of a means for dispersing air in a liquid stream under pressure as at 12 and 14 of Fig. 1.

An embodiment of the above device is illustrated in Fig. 15 in which 146 is a high pressure centrifugal pump supplied with liquid through conduit 32 or 53 (Fig. 1) and discharging through conduit 147. Air under pressure, from a source not shown, is introduced into this conduit through branch conduit 40 controlled by valve 45. The mixed stream of liquid and air passes into a second centrifugal pump 148 in reverse to the normal flow directions. The blades 149 of this pump may be provided with a multiplicity of perforations 150—150 and, as indicated by arrow 151, the direction of rotation of the blades is reversed to the normal pumping direction, thus creating a high degree of turbulence and delivering an intimate dispersion of air in liquid into conduit 41 of Fig. 1.

A convenient embodiment of this device is shown schematically at 37 in Fig. 1. This is the well-known multistage, deep well turbine pump which, for this purpose, must have not less than two stages and preferably a considerably larger number, and which should be capable of discharging against a back pressure not less than 20# gauge while being supplied with air. The pump is arranged to draw its liquid supply from a vessel 38 in which the intake end is submerged, and delivers into a discharge chamber 39.

The air supply, from a source not shown, enters the pump through conduit 40, at a level at which the liquid has reached the desired pressure, for example, into the second or third stage from the delivery end.

We have found that the effectiveness of the flotation step is materially increased by utilizing the process described in U. S. Patent 1,376,459 to Nils Pedersen, of causing the liquid to dissolve air under pressure and thereafter releasing the pressure to cause the air to be evolved in minute bubbles. We therefore pass the mixture of air and liquid from pump discharge chamber 39 through conduit 41 to a retention chamber 42, of such capacity as to provide liquid retention of more or less five minutes. This chamber may be a standpipe as shown or may be any suitable enlargement of the discharge conduit.

The liquid leaving the upper end of the chamber passes through conduit 43 to an air trap 44 which vents any air which is too coarsely subdivided to be retained by the flowing liquid. This may be any steam trap having its connections rearranged to vent air as the liquid level falls rather than to vent liquid as the level rises. The amount of air vented from the trap affords a guide for the manual control of the air supply at valve 45.

It is essential to the best operation of the separating cells 13 and 15 that the feeds of aerated liquor to them be in constant volume. Even a minor degree of surging, such as may not prevent the clean separation of the top or flotation mud, will very undesirably impede the sedimentation by which the bottom mud is separated, increasing the proportion of cellulose passing out with the primary liquor and the proportion of algin passing out with the primary bottom mud. We avoid surging and its attendant disadvantages by restricting the feed stream to a constant cross-sectional area maintained at a constant pressure.

For example, a fitting 46 retaining an orifice plate having, preferably, a sharp-edged orifice, is placed in conduit 43, the area of the orifice being such as to pass the required volume at the preferred pressure. The pressure upstream from this orifice is stabilized by a suitable pressure regulator, for example a throttling valve 47 actuated by a diaphragm or bellows 48 which in turn is responsive to the pressure in the feed line above the orifice, as indicated at 49. By this means a feed of constant volume to the separating cell is assured, this feed passing from the orifice, at approximately atmospheric pressure, into a feed distributing box 50 which is an element of each of the separating cells 13 and 15.

In separating cell 13, the construction and operation of which are described at a later point, the stream of crude liquor is fractionated into three product streams: (1) of "primary liquor," leaving the cell through conduit 16 as the product of the operation, this being a relatively concentrated solution of sodium alginate containing from 25% down to a trace of the original cellulose content of the "crude liquor;" (2) a "top mud" produced by flotation, leaving the cell through conduits 51—51, and (3) a "bottom mud" produced by sedimentation, leaving the cell through conduit 52.

The two muds from the primary cell, containing from 75% to substantially all of the cellulose of the crude liquor, are combined in conduit 53 to pass to the secondary aerator 14 in which the mixed mud is blended with fresh water from conduit 31. The quantity of water is regulated to produce at least approximately the desired degree of dilution of the crude liquor in tank 11 when returned thereto in the secondary liquor. An addition of an alkaline solution for control of the pH value of the liquid through the secondary separations may be made at this point, through conduit 54.

The blended mud stream passes through a succession of elements: aerator, retention chamber, trap and orifice control means into the separating cell 15. Ordinarily this succession will consist of elements substantially identical with those above described. In this cell the liquid is fractionated to produce two "secondary" mud streams, both rich in cellulose and lean in algin, which are collected in conduit 17 and discarded or otherwise disposed of, and a dilute solution of sodium alginate substantially free from cellulose, the "secondary liquor," which is returned to tanks 10 and 11 through conduit 18.

The separating units 13 and 15 may be identical or closely similar in structure, though as separation in the secondary stage is more rapid than in the primary, cell 15 may be smaller than cell 13, or two primary cycles may be provided to feed mud into one secondary. The structure of these units is illustrated in detail in Figs. 2 to 13 inclusive, reference being first made to Figs. 2 and 3.

Figure 2:
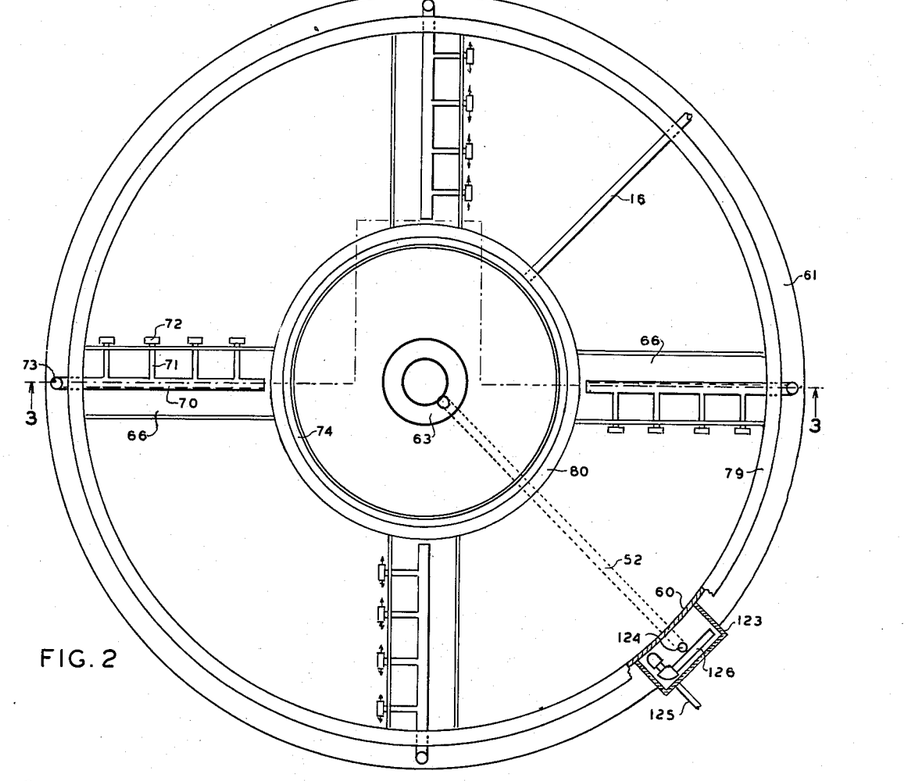
Fig. 2 is a plan view of one of the separating cells 13 or 15 with all moving parts removed, taken on the line 2—2 of Fig. 3.
Figure 3:
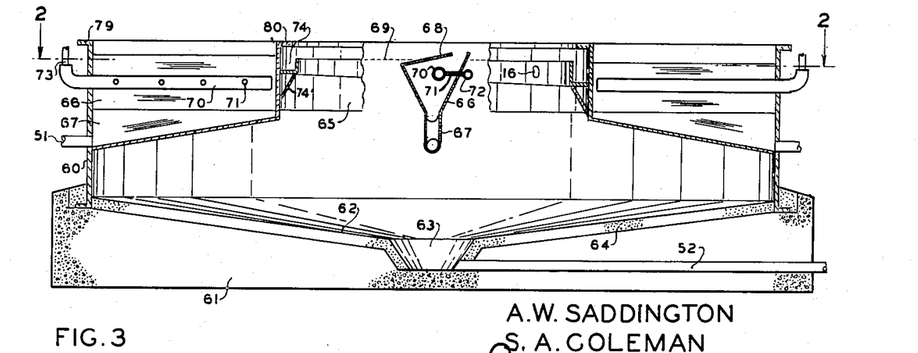
Fig. 3 is a vertical section and partial internal elevation of the shell, taken on the broken line 3—3 of Fig. 2.

The basic unit of the cell is a relatively wide and low, open cylindrical tank having a gently sloping bottom. This tank may be constructed of any preferred materials, but it will be found economical and otherwise desirable to use a metallic ring wall 60 sealed at its lower end into a concrete block 61 of which the upper surface, forming the tank bottom 62, slopes toward a central well 63. Tightness is produced by a surface layer 64 of fine grained concrete, applied after the body of the block has hardened.

Inside the shell ring and concentric with it is a baffle ring 65, which is supported and spaced from the shell by a plurality (preferably four) of top mud collecting troughs 66, welded at their opposite ends to the shell and baffle respectively. These troughs terminate at the lower edge in a drainage trough 67 which slopes outwardly and delivers the top mud into collecting conduit 51.

In addition to supporting the baffle ring, these troughs serve a dual purpose: to receive and carry away the mud produced by flotation, and to support the feed pipes 70—71 with the minimum of horizontal surface below liquid level. Such surface, whether upwardly or downwardly directed, tends to accumulate mud deposits and to suddenly release them, with severe disturbance of the separations. The V-shape of trough 66 also is designed to avoid accumulations of this kind.

The edge of each trough which is first encountered by the rotating skimmers is provided with a sloping ramp 68, the lower edge of which is below and the upper edge above the liquid level indicated by dotted line 69.

The feed of crude liquor is introduced into the annular space between shell and baffle by any means which will distribute the feed over the width of the annulus and deliver it into the liquid body with the minimum of disturbance. This means, which obviously might take diverse forms, is here illustrated as consisting of conduits 70—70 which are closed at the end adjacent the baffle ring and are provided with branch pipes 71—71 extending through the wall of the trough and terminating in T's 72—72 bull-headed on the branch pipes. These T's should be of much smaller pipe size than conduits 70, for example, if the latter are of 4" pipe the T's may be of 1½" pipe size. The conduits 70 are supplied by feed pipes 73 connecting them with feed distributing box 50.

Within the baffle ring is a circumferential launder 74 into which clear or relatively clear liquor overflows and from which it is drained by conduit 16 (of primary cell 13) or conduit 18 (of secondary cell 15). The floor of this launder should drain toward the outlet opening. It is desirable to extend a sloping skirt 74' from the lower corner of the launder to the baffle wall to avoid mud accumulation.

Figure 4:
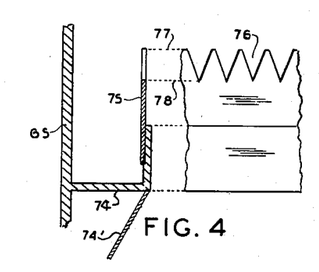
Fig. 4 is a section and fragmental extension of the launder 74 of Fig. 3.

The launder is shown on a larger scale in Fig. 4, in section and also in fragmental extension. The upturned edge of the trough is provided with a weir 75, of thin stainless steel, the upper edge of the weir being serrated as at 76. This element maintains the liquid level 69 within the limits fixed by the depth of the serrations, indicated by dotted lines 77—78, or at least so long as the withdrawal of bottom mud by means later described is not too rapid. The limits 77—78 in turn fix the relative height of ramp 68 (see Figs. 3 and 10), which must extend above and below these limits.

The upper edges of shell and baffle ring are provided with flanges 79 and 80 for the support of the rotating skimmer elements now to be described with reference to Figs. 5, 6, 8 and 9.

Figure 6:
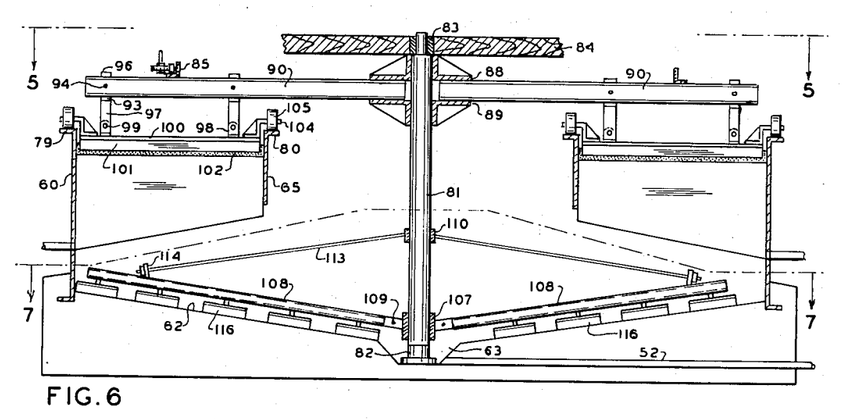
Fig. 6 is a vertical section through one of the separating cells, as on the line 6—6 of Fig. 5, illustrating the skimmers and the bottom rakes in operative relation.

Referring first to Fig. 6, a central vertical shaft 81 is mounted on a step bearing 82 fixed to the bottom of well 63. The upper end of the shaft runs in a bearing 83 carried in any convenient stationary structural member 84 which may well be an element of a platform over the tank.

The shaft may be rotated by any means which will give a smooth and positive drive, free from hunting or jerking, for example by a bull wheel 85 of the greatest possible diameter. This bull wheel may be a spur, bevel or worm gear, but for economy in construction we prefer to weld a circle of angle iron to the skimmer arms described below and to tack weld to the vertical leg of the angle a continuous band of roller sprocket chain 86. The bull wheel is driven by a sprocket pinion 87 from any source of power not shown, preferably an individual electric motor.

The upper portion of the shaft carries two discs 88 and 89, keyed or welded to the shaft, and a plurality of radially directed skimmer arms 90—90 are welded between the discs at their inner ends. These arms are preferably constructed from pairs of channel members 91—91 (see Fig. 8), spaced apart at suitable intervals as by blocks 92 and evenly spaced radially by attachment to bull wheel 85.

Figure 5:
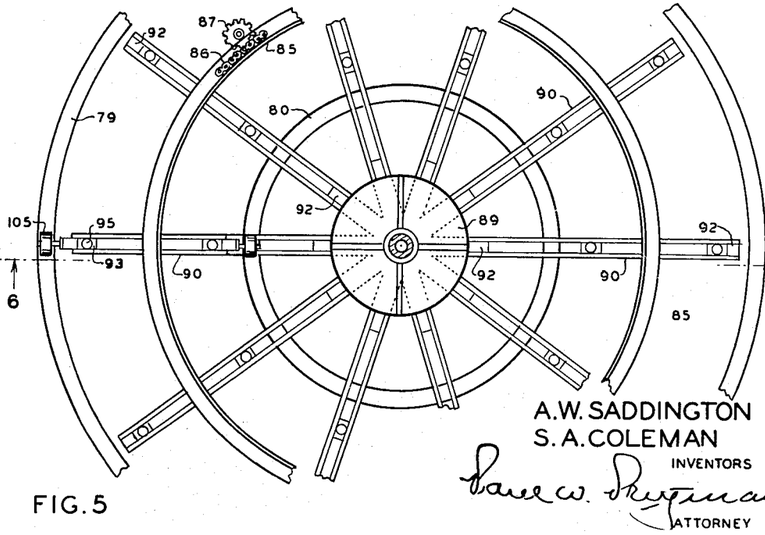
Fig. 5 is a fragmental plan view of the skimmer spider 88—90, taken on the line 5—5 of Fig. 6.

At about the locations indicated in Figs. 5 and 6, slide blocks 93, placed between the channels, are supported on pivot pins 94 entering corresponding depressions in the block, which is thus free to swing in a vertical plane longitudinally of the arm. A slide 95 having an enlarged head 96 is mounted in a vertical bore formed in the block. The lower end of the slide is flattened, as at 97, to pass between the arms of a yoke 98 in which it is pivoted on a pin 99. Thus mounted, the slide, to which the skimmer is attached, is free to rise and fall and also to swing in a vertical radial plane.

The yoke 98 has a base plate 100 carrying two thin, L-shaped elements 101 which grip a strip of rubber or other flexible material 102. This strip extends from the inner wall of tank shell 60 to the outer wall of baffle ring 65. The two pivots 94 and 99 permit this skimming element to move laterally in the annulus between tank wall and baffle ring and thus to follow any irregularities in contour of the tank shell. It is much easier to bring the baffle ring into parallelism with a somewhat out-of-round tank shell than to build a large diameter tank to a true circle.

Each skimmer has at each end a bracket 103 (see Fig. 9) attached to the upper face of yoke plate 100, these brackets carrying pins 104 on which rollers 105 are free to revolve. These rollers normally rest on flanges 79 and 80, these flanges forming tracks which are level except at the points (e. g., "A" in Fig. 10) where the skimmers approach ramp 68. Between the humps later referred to, the flanges and rollers support the skimmer blade 101 in a position in which it dips a short distance below the liquid level 69 in the tank.

Figure 10:
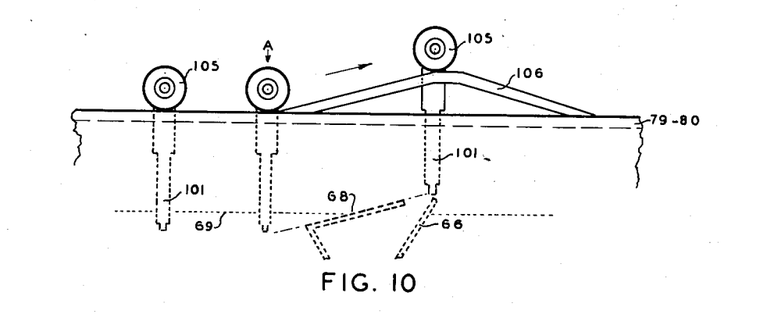
Fig. 10 is a diagram illustrating the travel of the skimmer blade up the ramp 68 and over the further edge of trough 66.

As the blade approaches the lower edge of ramp 68, the rollers ride on the slope of a hump element 106 affixed to each track, carrying the blade up the sloping upper surface of the ramp and over its farther edge, after which the blade dips into the liquid gently and without disturbing the upper layer of top mud.

Figure 8:
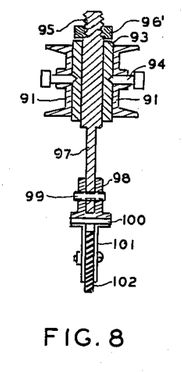
Fig. 8 is a vertical section through a skimmer arm and the attached skimmer.
Figure 9:
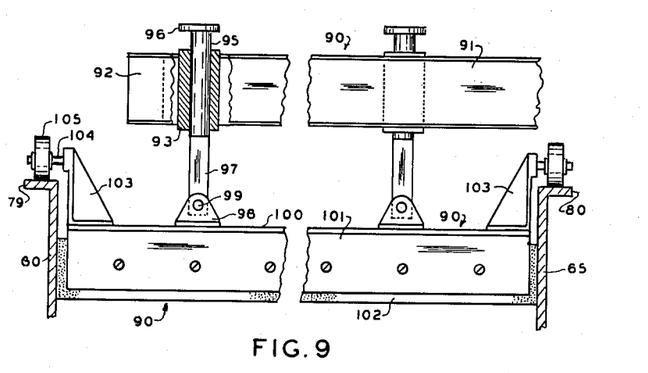
Fig. 9 is a fragmental elevation of a skimmer arm and the attached skimmer, illustrating the suspension of the skimmers from rollers resting on tank flanges.

The device just described may be modified by replacing the enlarged head 96 as shown in Fig. 9 by a large threaded nut as at 96' in Fig. 8. This modification has two advantages: first, that it permits the effective length of slide 95 to be so adjusted with respect to the height of bracket 103 that the rollers 105 will not rest on the level portions of the flanges 79 and 80 but will clear them slightly, engaging only the humps 106. This will avoid any difficulty otherwise experienced in making the tank and baffle ring flanges smooth and level.

A further advantage of this modification is that it permits an adjustment of the depth to which the blade dips below the surface of the liquid, thus skimming off all of the top mud with the least disturbance of the liquid immediately beneath it.

The final moving element in the separating unit is the bottom rake, which moves the bottom mud into central well 63. This element is shown in elevation in Fig. 6 and in plan in Fig. 7, with certain details of construction illustrated in Figs. 11 and 12.

Figure 7:
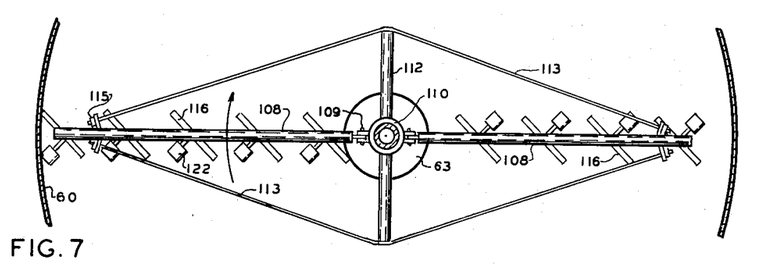
Fig. 7 is a plan view of the bottom rake assembly, as on the line 7—7 of Fig. 6.

A collar 107 is fastened to shaft 81 adjacent its lower end and two arms 108 are hinged to the collar as at 109. A second collar 110 is fastened to the shaft at a higher level and horizontal struts 112 are projected from it at right angles to the arms. Truss rods 113 connect the ends of these struts with the ends of the arms. The truss rods should be provided with means for varying their effective length, for example a lug 114 projected from the arm and a nut 115 threaded on the rod and engaging the lug.

This arrangement of struts and truss rods provides for supporting arms 108 in position parallel with the tank bottom and forms with the arms a rigid spider. The purpose of rigidity is to prevent hunting of the arms which, if permitted, would tend to disturb the extremely light bottom mud. Only two arms 108 are shown in Fig. 7 but any larger number may be used and arranged in the same general manner.

Figure 11:
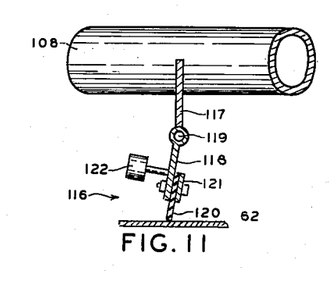
Fig. 11 is a cross section through one of the bottom wipers.
Figure 12:
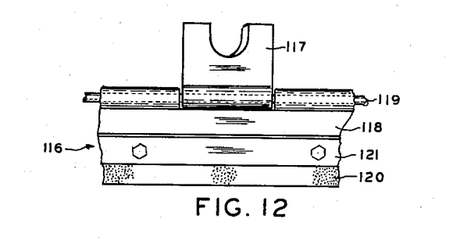
Fig. 12 is a fragmental face elevation of the same.

The wipers 116, in any required number, are hinged to the lower side of each arm and at an angle to its axis, this angle preferably being not less than 45°. The method of mounting the wipers is illustrated in Figs. 11 and 12.

A plate 117 is notched to receive the lower half of the arm 108 at the desired angle, and is welded in place. The wiper assembly 116 includes this plate, a second plate 118 swinging on a long pin 119, a strip of rubber or other flexible material 120 and a metallic strip 121 clamping the rubber in place. The height of arm 108 is so adjusted that the wiper meets the tank bottom 62 at a slight angle to the vertical, trailing the arm, and a weight 122 projected rearwardly from plate 118 holds the wiper in contact with the bottom while permitting it to ride over slight irregularities in the surface.

The spacing of the wipers on the arms should be such that the entire tank bottom is swept at least once and preferably twice at each revolution of the rake assembly. The cellulosic muds separating from alginic solutions are excessively subject to bacterial action if allowed to collect for more than brief periods, this action resulting in severe depreciation of the quality of the algin. Thus it is essential that the bottom be kept free from any lasting collection of sediment, even in restricted areas. The outermost wiper on each arm should reach to the immediate edge of the tank bottom and the innermost element on the same arm to the edge of well 63, the intermediate wipers being so spaced that the areas swept by them overlap at least slightly. With this arrangement each arm sweeps the entire tank bottom at each revolution.

It is highly desirable that the rate of drainage of the bottom mud be as nearly constant as possible while being subject to control for the adjustment of the relative quantities of bottom mud and clarified liquid flowing from the tank. A convenient device for this purpose is shown in plan at 123 in Fig. 2 and in internal elevation in Fig. 13.

Figure 13:
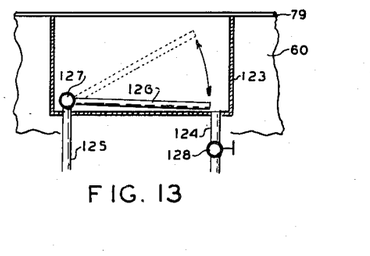
Fig. 13 is a diagram illustrating alternative connections to a device for controlling liquid flows by means of a manually adjustable swing pipe.

The device illustrated includes an open top box or tank 123 attached at any convenient point on the circumference to the exterior face of tank wall 60, the upper edge of the box being approximately level with the top of the tank. This box is provided with two pipe connections, one (as at 124) terminating at the bottom of the box, the other (as at 125) extending through it and supporting a swing pipe 126 on any swivelling coupling means 127.

One of the pipes 124—125 is connected with the conduit (53 or 17 of Fig. 1) by which the bottom mud is conveyed to the next element in the system; the other with conduit 52 which drains the mud from central well 63. Either order of connection may be used, but the functioning of the device is not exactly the same in the two instances.

Thus, if pipe 125 is connected with conduit 52 and pipe 124 with conduit 53, the flow of mud is from the swing pipe into the box, and by the provision of a manual valve 128 in pipe 124 it becomes possible to gauge the flow of mud from the tank by closing the valve and noting the time required for the box to fill.

The ability to make this measurement is a convenience, but we have noted some tendency for mud outflowing in the swingpipe to accumulate deposits which choke the flow and disturb smooth operation. Such choking is much less likely to occur when the connections are reversed and the flow is out of the box into the swingpipe, provided this pipe discharges into a conduit of ample size and free from serious obstructions.

With either order of connection, the swing of pipe 126 must be such that its free end will traverse the depth of the serrations 76 of launder 74, these serrations and the swing pipe cooperating to fix the tank liquid level 69. The height of the launder being fixed, adjustment of the position of the swingpipe will vary the relative quantities of clarified liquid and bottom mud flowing from the tank, and thus permit the mud to be held at the most desirable concentration of solids. Ordinarily this will be the maximum solids content at which the mud will flow steadily from the tank. The quantity of top mud removed by the skimmers is little if at all affected by variation in the liquid level, this quantity varying with the effectiveness of the flotation step and the proportion of solids capable of removal by flotation.

The best result in separations such as that of cellulose from crude alginic liquors is attained by so directing the apparatus and its manipulation as to remove the maximum proportion of the suspensoid in the flotation step. This because the sedimenting effect is inherently slow and is highly sensitive to disturbing influences, but is greatly accelerated by progressive reduction in the proportion of suspensoid remaining after flotation.

The top or flotation mud from crude alginic liquors and other suspensions of like character is very light, rises rapidly to the surface and is not readily redispersed in the liquid from which it separates. On the other hand, the attachment of the buoying air bubbles to the solid particles is temporary and thus the maximum removal by flotation requires that the top mud be skimmed off before any large proportion of the solid particles lose their air bubbles and begin to subside.

In contrast to the above, the sedimentation mud will remain indefinitely on the tank bottom if not disturbed but, because of the extremely slight gravity difference between the suspensoid and the liquid, the sediment layer is very unstable and is readily redispersed in the liquid from which it has been deposited.

The above considerations are governing in arriving at optimum proportions, numbers and operating speeds of various elements of the separating cells.

To avoid redispersing the bottom mud, it is essential to rotate the bottom rakes at a very low speed and in such manner that the top speed of the arms will be completely uniform, free from hunting or jerking. In an illustrative cylindrical cell of 25 feet diameter we prefer to rotate the bottom rakes at about one revolution per hour, or between the limits 30 minutes to 80 minutes per complete revolution. This is equivalent to top speeds from 50 to 125 feet per hour, which may be taken as a guide to rates of rotation in tanks of other diameters.

At such rotative speeds, the removal of top mud by a single skimmer moving the mud into a single collecting trough is far too slow, the mud remaining on the upper surface so long that a large part of the buoying air bubbles become disengaged, with loss of a correspondingly large part of the value of the flotation step in accelerating sedimentation.

While it is possible to drive the rakes and the skimmers at different speeds, this is undesirable as tending to considerable complication of apparatus. Further, speeding up the skimmers increases turbulence in the top mud layer and unduly rapid disengagement of air bubbles. We therefore prefer to provide for the prompt removal of top mud by multiplying both the number of collecting troughs and the number of skimmers, thus producing a multiplicity of removals of top mud with each revolution of the skimming assembly and of the bottom wipers, permitting the two elements to rotate at the same rate.

We have found that in a cell of about 25 feet diameter, the number of collecting troughs 66 should be not less than three and preferably four, or in cells of other diameters the optimum number may be found by dividing the cell diameter in feet by six or eight and taking the nearest whole number. The number of individual skimmers should be greater than the number of collecting troughs, not less than double and preferably two and one-half or three times the number of troughs.

It should be cautioned that it is possible to carry this multiplication of skimming effects too far. If insufficient time be allowed in each segment of the upper surface, as defined by the space between troughs, for a material part of the liquid to settle out of the mud layer, the effectiveness of the flotation may be decreased.

The uniform rate of advance of the bottom wipers which is important in avoiding redispersion of the bottom mud is attained, in the apparatus shown, by rigidity of the moving elements combined with constant speed drive. The shaft 81 should be of large diameter and hollow, as for example a 6" double extra strong pipe, which has high torsional rigidity. The bull wheel 85 should be as large as feasible, as for example one having from seven-tenths to nine-tenths the diameter of the tank. The wiper arms 108 should be hollow and of sufficient diameter to be stiff when tied together at their ends only, or an additional set of tie rods 114 may be used at midlength of the arms. The prime mover should be a constant speed element, for example a synchronous motor, and any speed reduction or control between this motor and sprocket 87 should be positive, avoiding chains or belts which might tend to whip. The angle iron ring 85 which is the basis of the bull wheel should be stiff and the chain 86 should be drawn tightly around it and tacked at such short intervals as to avoid risk of local creeping or bulging.

The proportionate dimensions of the fixed elements of the cell are highly important in producing the greatest overall separation of suspensoid from a liquid very nearly as heavy as the suspensoid, and particularly from a viscous liquid.

First, the enclosing tank should be relatively wide and shallow, to spread the flotation mud into a thin layer and to minimize the distance through which subsiding particles must travel before they come to rest. The best results will be attained when the inner height of the tank wall is not more than one-fourth and preferably about one-fifth of the diameter of the tank.

Second, the baffle ring 65 which divides the inner cylindrical compartment from the outer annular compartment, should have a liberal clearance from the tank bottom. This ring, which necessarily projects above the surface of the liquid body in the tank and therefore has its upper edge more or less level with the tank rim, should have a height not greater than six-tenths and preferably not greater than four-tenths the height of the tank wall. This allows space for the suspension flowing from the outer to the inner compartment to reverse its direction of vertical flow without disturbance of the sensitive bottom mud.

Finally, the horizontal area of the annular outer compartment should be much greater than that of the cylindrical inner compartment, not less than four times and preferably up to eight times greater.

In the inner compartment the direction of liquid flow is counter to that of particle movement in settling and, as the settling rate of these fine suspensoids is low, this compartment has only a minor and often no value for sedimentation, functioning merely as an overflow conduit.

In the annular outer compartment the liquid flows downwardly, accelerating deposition of solids and making this portion of the tank highly effective for sedimentation. Thus, while the increase in upward velocity resulting from narrowing the inner compartment increases the tendency toward carry-over of such solids as enter its lower end, the accompanying widening of the outer compartment far more than offsets this disadvantage by increasing the extent of deposition and thus reducing the proportion of suspensoid entering the inner compartment and becoming subject to carry-over.

The above limitations to proportions and the like are based on experience in the separation of cellulose from alginic liquors, and in that use are believed to be critical as defining conditions producing maximum separation. In the handling of other suspensions to which the apparatus may be applied, these limitations should be considered as suggestive rather than critical.

In the separation of cellulose from alginic solutions, in which the values are in the algin solute, in which the cellulose is substantially or entirely waste, in which the solution is initially too viscous to be handled without dilution and in which excessive dilution of the liquor must be avoided, the use of the two stages of separating apparatus is essential to the recovery of a feasible proportion of the original algin content without diluting it to the point at which the recovery of the algin from the clarified solution would be impracticable.

In the separation of generally similar suspensions which are initially of low viscosity or in which there is no limit to the extent to which dilution can be carried, it is often feasible to use the first stage apparatus alone, either to accomplish the final result desired or for a preliminary treatment in advance of other separating means such as filters, centrifuges or simple settling tanks.

The major utility of the apparatus is in the separation of suspensions such as alginic solutions, in which severe depreciation of the quality of the solute results from bacterial action at relatively low temperatures or from depolymerization at temperatures at which bacterial action is inhibited. These are progressive reactions, which are reduced in undesirable effect in direct proportion to any shortening of time under treatment.

In this respect the described apparatus, when operated under suitable conditions of viscosity and temperature of solution, produces a result which has not heretofore been attained in the clarification of algin solutions.

So large a proportion of the total cellulose is separated by the primary flotation, and the subsequent sedimentation is so accelerated thereby, that the residence of the solution in the primary stage, from which the greater part of the original algin is withdrawn, is reduced far below that required in any separating method heretofore used.

For example, the residence of the solution in the primary stage need not exceed one hour, even with the minimum dilution of the liquor and the consequent minimum cost of recovery of the algin from the clarified liquor. This reduction in clarifying time minimizes the reduction in viscosity-producing value of the final product of soluble alginic salts which is inherent in any clarifying process, and makes it possible to produce higher viscosity and more valuable alginic salts than any heretofore produced and at a less cost for apparatus, for clarification and for subsequent treatments.

We claim as our invention:

1. Apparatus for clarifying in a continuous process a viscous alginic solution resulting from the digestion of kelp with an aqueous alkali, comprising in combination: means for diluting said solution to a required viscosity; means to form the diluted solution into a stream and for dispersing minute bubbles in the stream; a primary separating cell receiving the aerated stream, said cell provided with means for parting a flotation mud and a sedimentation mud from a slowly flowing body of said solution; means for withdrawing a stream of clarified solution from said flowing body as the clarified end product of the apparatus; means for intermixing a combined stream of said parted muds with a stream of water; means for dispersing minute air bubbles in said intermixed stream; a secondary separating cell receiving the intermixed stream in which last said air bubbles are dispersed, said secondary cell provided with means for parting flotation and sedimentation muds therefrom and for withdrawing last said muds from said secondary cell, and means for returning the liquid from which last said muds were parted to first said diluting means.

2. Apparatus as described in claim 1, further including means responsive to the viscosity of said diluted solution for controlling an additional flow of water thereinto.

3. Apparatus as described in claim 2, in which said water-flow controlling means includes a torsion viscosimeter having an immersed element rotating at constant speed in a flowing bath of said diluted solution.

4. Apparatus as described in claim 1, in which said air bubble dispersing means includes a liquid pump capable of raising said stream of solution to a material superatmospheric pressure; means for introducing a stream of air under pressure into the liquid stream discharged by said pump, and dispersing means receiving the resultant mixture of liquid and air and subjecting said mixture to conditions of turbulence while under pressure created by said liquid pump.

5. Apparatus as described in claim 4, in which said liquid pump and said dispersing means are combined in a vertical turbine pump having a plurality of stages, the lower stages providing the pumping means and the upper stages the dispersing means, the air stream being introduced between two of said stages.

6. Apparatus as described in claim 1, further including means to maintain the rate of flow of the solution into said primary cell at constant flow volume.

7. Apparatus as described in claim 6, in which said flow volume maintaining means includes an orifice plate having a fixed orifice and a pressure regulator responsive to pressure in said stream upstream from said orifice for maintaining a constant pressure head on said orifice.

8. Apparatus as described in claim 1, which includes means to separate heavy particles, including sand, from said solution prior to introduction of the solution into said first mentioned bubble-dispersing means.

9. A flotation system for clarifying a viscous alginic solution resulting from the digestion of kelp with an aqueous alkali, comprising in combination: primary processing means for aerating a stream of solution and isolating solids therefrom by flotation and sedimentation successively to produce a clarified solution output from said primary processing means as the end product of the system; a plurality of reservoirs to hold fresh bodies of said solution wherein heavy solids are settled out of the solution, said reservoirs being adapted for use in succession to supply a stream of the solution to said primary processing means; means to supply fresh quantities of said alginic solution to said reservoirs; secondary processing mean for aerating a stream of a solution and isolating solids therefrom by flotation and sedimentation successively; means to add new liquid to the solids isolated by said primary processing means to supply a stream of solution to said secondary processing means; and means to deliver the clarified solution from said secondary processing means to said plurality of reservoirs to dilute said fresh bodies of the alginic solution.

10. A flotation system as set forth in claim 9 which includes means responsive to the viscosity of stream of the solution supplied to said primary processing means to add liquid to the fresh solution to maintain a predetermined viscosity in the supply stream.

11. A flotation system for clarifying a viscous alginic solution resulting from the digestion of kelp with an aqueous alkali, comprising: at least one reservoir to hold a fresh supply of said alginic solution; a feed tank; means including a pump to deliver the fresh solution from said reservoir to said feed tank; primary processing means for aerating a stream of a solution and isolating solids therefrom by flotation and sedimentation successively to produce a clarified solution output from said primary processing means as the end product of the system; means to deliver a stream of the fresh solution from said feed tank to said primary processing means; means to supply diluent liquid to the intake side of said pump means in response to the viscosity of the stream from the supply tank to regulate said diluent supply means to maintain said viscosity substantially at a predetermined value; secondary processing means for aerating a stream of a solution and isolating solids therefrom by flotation and sedimentation successively; means to add new liquid to the solids isolated by said primary processing means to supply a stream of solution to said secondary processing means; and means to deliver the clarified solution from said secondary processing means to said reservoir to dilute said fresh supply of the alginic solution.

12. A flotation system as set forth in claim 11, which includes a second pump to deliver the fresh alginic solution to said reservoir and in which the means for delivering the clarified solution from said secondary processing means is connected with the intake side of said second pump.

13. A flotation system for clarifying a viscous alginic solution resulting from the digestion of kelp with an aqueous alkali, comprising: at least one reservoir to hold a fresh supply of said alginic solution; a pump to deliver the fresh alginic solution to said reservoir; a feed tank; means including a pump to deliver the solution from said reservoir to said feed tank; primary processing means for aerating a stream of a solution and isolating solids therefrom by flotation and sedimentation successively to produce a clarified solution output from said primary processing means as the end product of the system; means to deliver a stream of the solution from said feed tank to said primary processing means; secondary processing means for aerating a stream of a solution and isolating solids therefrom by flotation and sedimentation successively; means to add new liquid to the solids isolated by said primary processing means to supply a stream of solution to said secondary processing means; and means to recycle the clarified solution from said secondary processing means, said recycling means having connections with the intake sides of said two pumps.

14. A flotation system as set forth in claim 13 which includes means to supply a diluent on the intake side of said second mentioned pump; and which includes means responsive to the viscosity of the stream delivered by said feed tank to control said diluent supplying means thereby to maintain said viscosity substantially constant.

15. A flotation system for clarifying a viscous alginic solution resulting from the digestion of kelp with an aqueous alkali, comprising: primary processing means for aerating a stream of a solution and isolating solids therefrom by flotation and sedimentation successively to produce a clarified solution output from said primary processing means as the end product of the system; means including a pump to deliver a fresh supply of said alginic solution in a stream to said primary processing means; secondary processing means for aerating a stream of a solution and isolating solids therefrom by flotation and sedimentation successively; means to add new liquid to the solids isolated by said primary processing means to supply a stream of solution to said secondary processing means; and means to deliver the clarified solution from said secondary processing means to the intake side of said pump to dilute the fresh solution delivered by the pump.

16. A flotation system as described in claim 15, which includes means to deliver diluent to the intake side of said pump in response to changes in the viscosity of the stream delivered to said primary processing means thereby to maintain said viscosity substantially constant.

17. Apparatus for clarifying in a continuous process a viscous alginic solution resulting from the digestion of kelp with an aqueous alkali, comprising in combination: a primary separating cell; means including a conduit to disperse minute bubbles in the solution and to feed the bubble-entraining solution into said cell at a rate relative to the volumetric capacity of the cell to form therein a slowly flowing substantially non-turbulent stream; means in said cell including a conduit to direct said stream therethrough in a non-turbulent manner; means in said cell for parting a flotation mud and a sedimentation mud from said slowly flowing stream; means for withdrawing a stream of clarified solution from said slowly flowing stream in the cell as the clarified end product of the apparatus; a secondary separating cell; means for inter-mixing said parted muds with water and for introducing the resultant mixture into said secondary cell at a rate relative to the volumetric capacity of the secondary cell to form therein a slowly flowing substantially non-turbulent stream; means in said secondary cell to direct said stream therethrough in a non-turbulent manner; means in said secondary cell for parting a flotation mud and a sedimentation mud from said slowly flowing stream; and means for delivering the clarified solution from said secondary cell to said bubble-dispersing means for processing in said primary cell.

18. Apparatus as described in claim 17 in which said bubble-dispersing and a solution-feeding means includes a closed flow-retarding chamber for the bubble-entraining solution and automatic means for venting undispersed air from the upper end of said chamber.

References Cited in the file of this patent

UNITED STATES PATENTS

| Number | Name | Date |
|---|---|---|
| 668,211 | Powter | Feb. 19, 1901 |
| 1,825,155 | Meyers | Sept. 29, 1931 |
| 1,966,638 | Morgan | July 17, 1934 |
| 2,048,158 | Goodwin | July 21, 1936 |
| 2,091,051 | Mesinger | Aug. 24, 1937 |
| 2,128,551 | Le Gloahec et al. | Aug. 30, 1938 |
| 2,135,442 | Steindorf et al. | Nov. 1, 1938 |
| 2,220,574 | Little et al. | Nov. 5, 1940 |
| 2,237,882 | Lawlor et al. | Apr. 8, 1941 |
| 2,246,224 | Streander | June 17, 1941 |
| 2,248,177 | Karlstrom | July 8, 1941 |
| 2,360,811 | Kelly et al. | Oct. 17, 1944 |
| 2,417,688 | Jeffery | Mar. 18, 1947 |
| 2,446,655 | Lawrason | Aug. 10, 1948 |
| 2,454,653 | Kamp | Nov. 23, 1948 |
| 2,474,705 | Vaughan et al. | June 28, 1949 |